Figure 1:
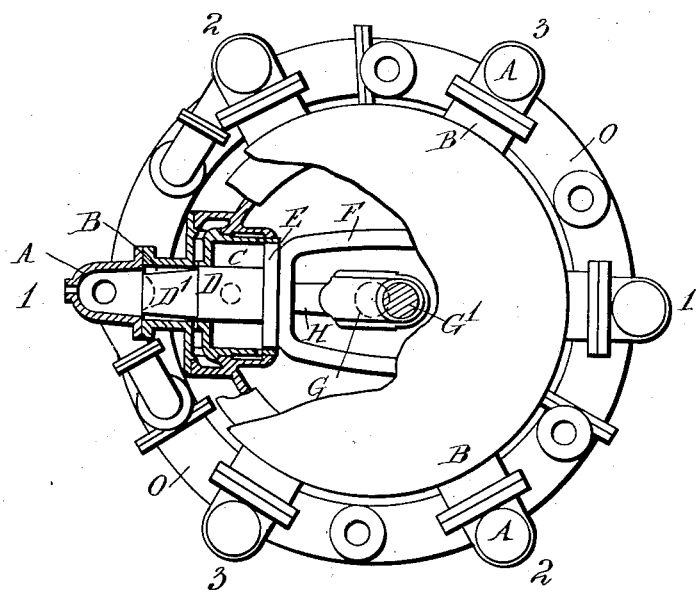

No. 884,042. PATENTED APR. 7, 1908.
W. J. RENSHAW.
MEANS FOR PRODUCING MOTIVE FLUID FROM THE COMBUSTION OF FUEL.
APPLICATION FILED JULY 12, 1906.

5 SHEETS—SHEET 1.

Witnesses.
W. P. Burke
J. H. Saunders

Inventor.
William John Renshaw
By Richard
ATTYS

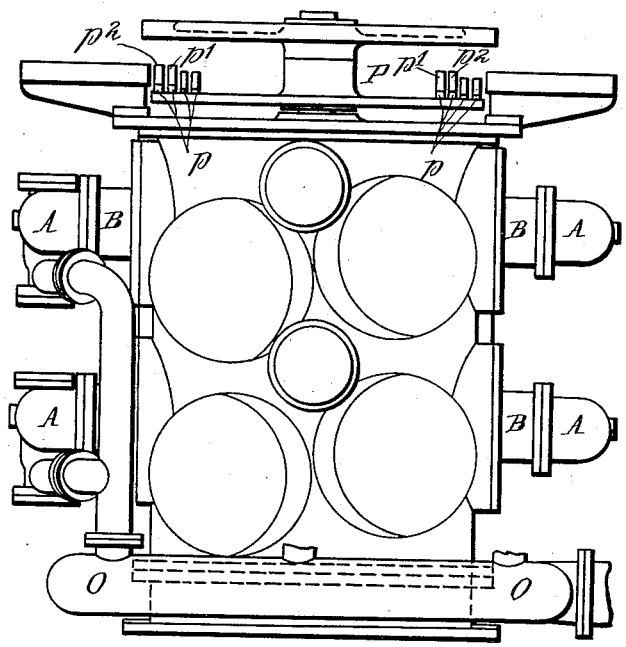

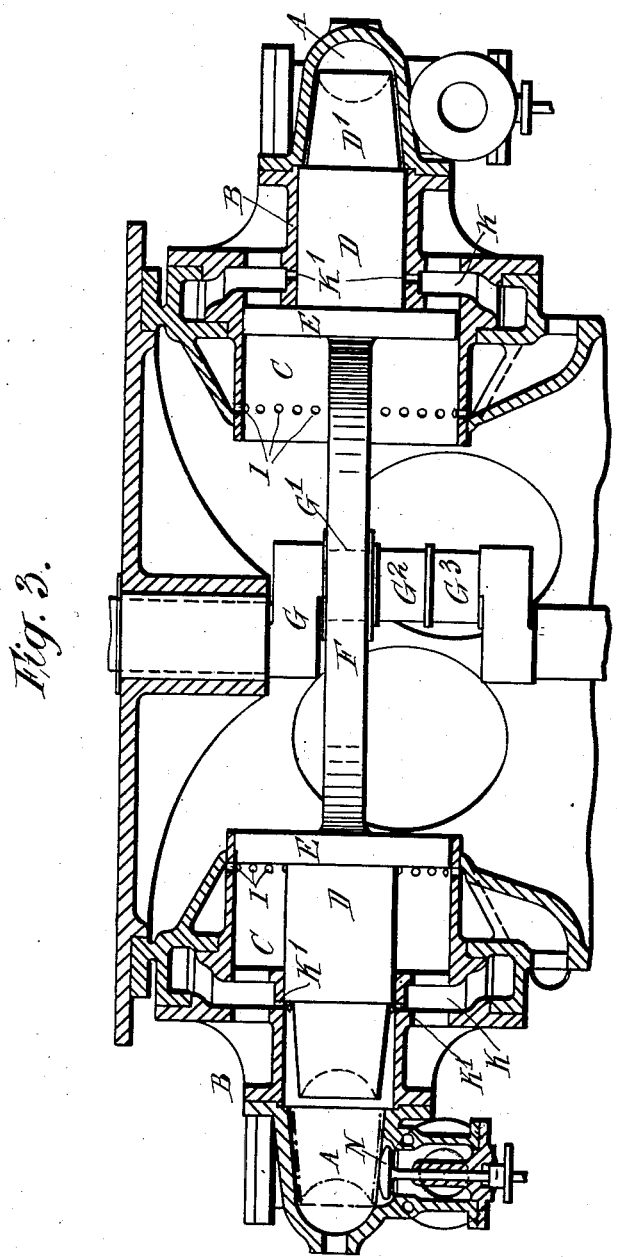

No. 884,042. PATENTED APR. 7, 1908.
W. J. RENSHAW.
MEANS FOR PRODUCING MOTIVE FLUID FROM THE COMBUSTION OF FUEL.
APPLICATION FILED JULY 12, 1906.
5 SHEETS—SHEET 4.
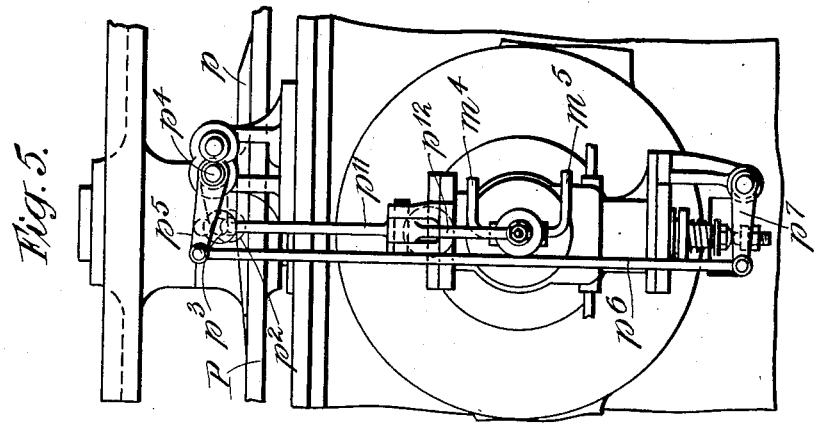
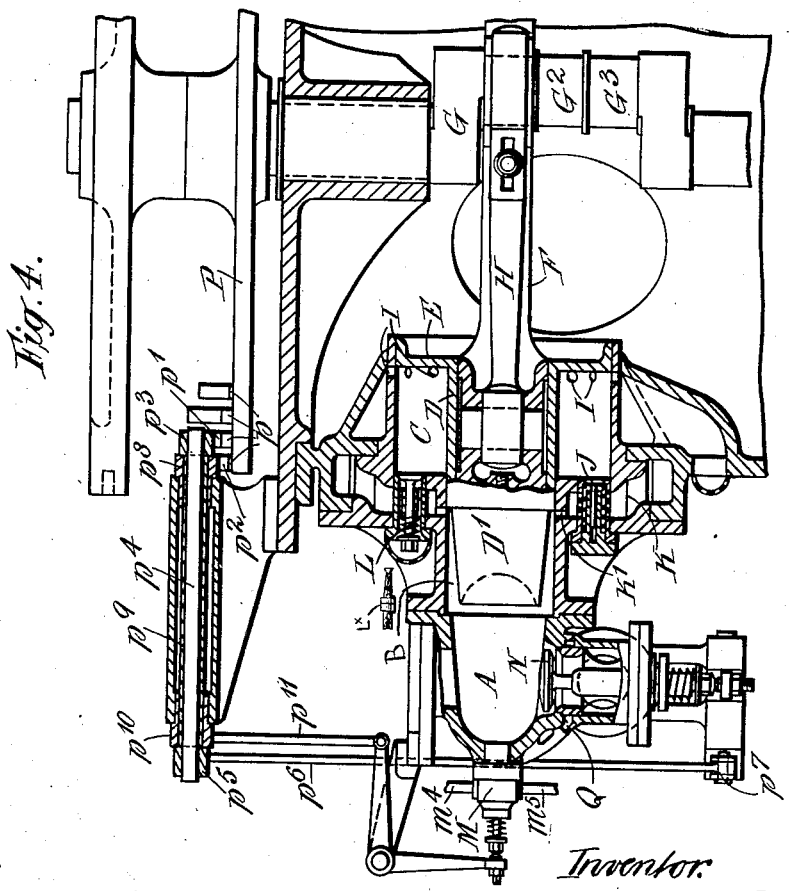
Witnesses.
W. P. Burke
J. H. Saunders
Inventor.
William John Renshaw
By Richardson
Att'ys No. 884,042.

PATENTED APR. 7, 1908.

W. J. RENSHAW.
MEANS FOR PRODUCING MOTIVE FLUID FROM THE COMBUSTION OF FUEL.
APPLICATION FILED JULY 12, 1906.

5 SHEETS—SHEET 5.

UNITED STATES PATENT OFFICE.

WILLIAM JOHN RENSHAW, OF NEWCASTLE, ENGLAND.

MEANS FOR PRODUCING MOTIVE FLUID FROM THE COMBUSTION OF FUEL.

No. 884,042.  Specification of Letters Patent.  Patented April 7, 1908.

Application filed July 12, 1906. Serial No. 325,944.

*To all whom it may concern:*

Be it known that I, WILLIAM JOHN RENSHAW, a subject of the King of Great Britain and Ireland, residing at Newcastle, in the county of Stafford, England, have invented new and useful Improvements in Means for Producing a Motive Fluid From the Combustion of Fuel, of which the following is a specification.

This invention relates to the construction of an apparatus for generating a motive fluid produced by the combustion of fuel said motive fluid being intended for use in a separate motor or motors.

An apparatus constructed according to my invention consists of a series of combustion cylinders co-acting with and connected to a corresponding number of compression cylinders, both being provided with the necessary pistons, inlet and outlet valves and connecting passages. The said apparatus is adapted to operate in such manner that the air which is compressed in the one series of cylinders by the force due to the combustion of the oil, gases, gaseous mixture or other fuel is passed into the other series of cylinders so as to extract from them and their pistons and parts the heat resulting from the burning of the oil or other fuel, the compressed air being then mixed with the products of combustion so as to form a motive fluid under pressure capable of being used expansively in any suitable reciprocating or rotary motor.

The series of combustion and compression cylinders may be arranged in sets of two, three or other number, vertically, horizontally or at any convenient angle upon a crank shaft and are preferably arranged in several tiers round a common crank shaft. Preferably the combustion and compression cylinders are arranged in pairs, one in front of the other, the compression cylinder being placed in front of the combustion cylinder and chamber. Each pair of duplex cylinders is fitted with pistons which are connected together and by a frame or yoke to those in the same line on the opposite side, this frame or yoke being coupled to the crank shaft by a connecting rod and the arrangement being repeated all round the crank shaft and in all the tiers. Each compression cylinder is fitted with the necessary valves and connections for drawing in a charge of air, and for compressing and forcing the air or mixture through the valves, passages and cylinders and combustion chambers of one or more of the other pairs of cylinders working in the same or adjacent set, so as to absorb the surplus heat from the combustion chambers and cylinders and force it into a storage vessel, pipe or temporary receptacle where it combines with the products of combustion from the combustion chambers and cylinders and if desired from any other source.

By the above described apparatus, I am enabled to utilize the force of the explosion arising from the combustion of suitable gases to compress a greater volume of air, mixed with a small percentage of aqueous vapor to a pressure equal to the volume multiplied by the pressure due to the explosion and by passing this greater and cooler volume of air through the combustion chambers and explosion cylinders to raise the temperature or increase the volume of air and to cool the explosion cylinders and combustion chambers to a mean between the heat due to the explosion or the combustion of the fuel and the greater volume of air passed through the compression cylinders and so produce a convenient volume of gases under pressure which when combined with the products of combustion and any heated gases derived from any suitable source form a mixture that may be used as aforesaid.

The accompanying drawings illustrate an embodiment of my invention, similar letters of reference being used in the figures thereof to indicate corresponding parts.

Figure 6:
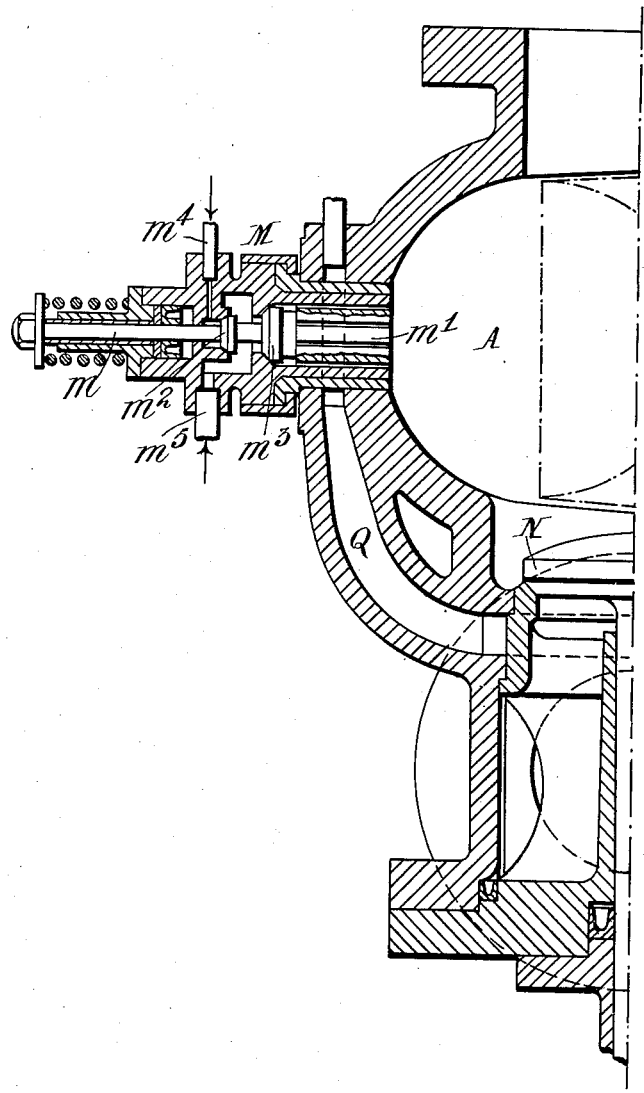

In these drawings, Figure 1 is a plan partly in section and Fig. 2 is a vertical elevation of an apparatus embodying my invention. Fig. 3 is a vertical section through a pair of combustion chambers and cylinders and compression cylinders, certain details of the valves being omitted for the sake of clearness. Figs. 4 and 5 are a section and end view showing the valves and the mechanisms for operating the same. Fig. 6 is a sectional view, on an enlarged scale, illustrating the details of the fuel valve, when oil and air are used as the combustible.

In the majority of the drawings and in the greater part of the following description, I have for the sake of simplicity shown and referred to the parts of my invention as if there was only one such part, but it is to be understood that such illustration or reference applies equally to the other like parts.

Referring now to the accompanying drawings, A are the combustion chambers, B the combustion cylinders and C the compression cylinders. I prefer to arrange the combustion chambers and cylinders and the compression cylinders in the manner shown by Figs. 1, 2, 3 and 4 of the drawings. As will be seen from these drawings, which illustrate a generating apparatus consisting of two tiers of three sets of oppositely arranged pairs, the sets, which are indicated in Figs. 1 and 2 by the numerals 1, 2, 3 are arranged at angles of 120° to and slightly above one another, the chambers and cylinders of the sets indicated by 2 and 3 being omitted from Fig. 2 for the sake of simplicity, only the openings in the main casting being shown. When this particular arrangement of sets and tiers of cylinders is employed each tier of cylinder sets is around a common crank as shown by Figs. 3 and 4, the two cranks being arranged for balancing purposes opposite one another, or 180° apart, as will be readily understood.

The combustion and compression cylinders B and C are provided with pistons D and E. The piston D of each combustion cylinder B is provided at its front end with a protecting cone $D^1$ which is formed hollow and is packed with asbestos or other non-conducting substance. The pistons D and E are connected in pairs by a suitable yoke or frame F spanning each throw of a crank shaft G this arrangement obtaining with each set or pair of pistons. Each throw of the crank shaft G is provided with three journals $G^1$, $G^2$ and $G^3$ for the reception of one end of a connecting rod, such as H, which is coupled at its other end to one of the joint pistons D, E. The crank shaft and cylinders are supported by castings which may be designed in any suitable manner.

I are ports provided in the walls of the compression cylinders for the admission of air. The air admitted by the ports I and compressed by the pistons D passes through non-return outlet valves, such as J, into an annular reservoir or receptacle K common to all the compression cylinders of the same or both sets.

L is an admission valve through which air and if desired a slight amount of water or other cooling fluid or liquid is admitted into each cylinder by means of the nozzle $L^\times$ (Fig. 4), for the purposes of reducing the vacuum obtaining in each cylinder as the piston moves outwards towards the center, reducing the heat generated during compression and of lowering the temperature of the combustion cylinder, chamber and piston and the exhaust valve.

I provide in connection with each combustion chamber A the following or other suitable arrangement of valves and means for operating the valves from the crank shaft. M is a valve for admitting a supply of oil, gas or other fuel or combustible to the combustion chamber A. The valve M, when used for admitting a mixture of oil and air, which use is given by way of example may be constructed as shown more clearly in Fig. 6, that is to say may consist of a spindle $m$ provided at its front end with a groove portion $m^1$ and at its intermediate parts with mushroom heads $m^2$ and $m^3$. Oil under pressure is admitted by the pipe $m^4$ and the air also under pressure is admitted by the pipe $m^5$. The mixture of oil and air is projected in streams into the combustion chamber by the grooved portion $m^1$ of the valve spindle. N is an exhaust valve which allows the products of combustion and the compressed air from the annular reservoir or receptacle K which has been heated by contact with the combustion piston, cylinder and chamber to pass into a common trunk O which is connected to a temporary storage vessel, receptacle or pipe, the contents of which would be used to work by expansion any convenient form of reciprocating or rotary engine or motor. $K^1$ are passages or ports by which the compressed air in the annular reservoir or receptacle K can pass into the combustion chambers when said ports are uncovered by the piston D. The valves M and N are operated at the required times by any suitable mechanisms which may be constructed as shown. As will be seen more clearly from Figs. 4 and 5 of the drawings, I may mount on the crank shaft G a disk P which is provided with a series of cams or inclines $p$ upon which rollers $p^1$, $p^2$ run. Each roller $p^1$ is supported at the outer end of a lever $p^3$ which is mounted on the inner end of a spindle $p^4$. The outer end of the spindle $p^4$ is provided with a lever $p^5$ which is connected by a link $p^6$ to a lever $p^7$ adapted to raise the exhaust valve N. Each roller $p^2$ is supported at the outer end of a lever $p^8$ which is mounted on the inner end of a sleeve $p^9$ encircling the spindle $p^4$. A lever $p^{10}$ is mounted on the outer end of the sleeve $p^9$ and is connected by a link $p^{11}$ to a bell crank lever $p^{12}$ the lower end of which is adapted to move the valve M. The above described arrangement of cams, rollers, levers, links and sleeves is repeated for each double cylinder in each set of the tiers. Q is a jacket containing water or other cooling medium which surrounds the exhaust and fuel admission valves N and M, as shown more clearly in Figs. 4 and 6. The steam or gases produced by the heat at said valves may be mixed with the products of combustion and the compressed air or other fluid under pressure.

It is to be understood that in addition to the combustion chambers and cylinders and pistons being protected from the great heat resulting from combustion the pipes and trunks leading therefrom are lined or otherwise protected and covered to prevent radiation of heat and preserve the materials of which these parts are formed.

The action of the above described apparatus will be understood from the following description of the actions that occur in one pair of opposite chambers and cylinders in the same line, the actions in the pairs of the other sets being identical, though taking place at different times.

Assuming that the proper amount of compressed air has been retained in the combustion chamber of one of the pair of cylinders in the same line, and the piston and the protecting cone of said combustion chamber or cylinder has been driven home by the pressure due to the explosion in the combustion chamber on the opposite side of the crank, the retained air being thereby further compressed and additionally heated, fuel is forced into the first named combustion chamber and burned. The combustion of the fuel and air increases the temperature and pressure in said chamber and drives out the joint piston thereof, so compressing the air or gaseous mixture that has passed into the compression cylinder on the opposite side. Towards the end of the outward stroke of said joint piston its exhaust valve opens and the air which has been forced in a compressed state into the annular reservoir or receptacle common to all the compression cylinders rushes into the combustion cylinder and chamber and forces out the products of combustion, so causing a reduction of the temperature of said combustion cylinder, chamber and piston. The compressed air mixes with the products of combustion and forms, together with the gases and steam generated around the exhaust and fuel admission valves if these are to be added, a heated fluid under pressure which may be passed into any convenient receptacle, vessel or pipe ready to be used in a reciprocating or rotary engine or motor. Ignition of the fuel is effected by the high temperature obtaining as a result of the further compression of that portion of the compressed air or gaseous mixture which has been drawn from the annular reservoir or receptacle common to all the compression cylinders and retained when the exhaust valve closes. For starting purposes a storage receptacle containing compressed air or other suitable means may be employed.

I wish it to be understood that I do not limit my invention to the precise forms and constructions shown as these may be varied according to circumstances, this being especially the case with respect to the construction of the valve for admitting fuel or combustible and the arrangements of chambers, cylinders and parts connected therewith.

I wish it to be understood that I make no claim to the use as a motor, pure and simple, of the details of construction of cylinders, valves and other parts shown, by the accompanying drawings, the subject matter of the present application being exclusively an apparatus for generating a motive fluid for use in any suitable form of separate motor.

Having now described my invention what I claim as new and desire to secure by Letters Patent of the United States is as follows:—

1. An apparatus for generating a motive fluid to be used expansively in a separate motor or motors consisting of a series of cylinders arranged around a common crank shaft in which cylinders moist air is compressed, a reservoir adapted to receive the compressed air from all the compression cylinders, a series of combustion cylinders also arranged around said crank shaft in which oil and air or other combustible is burned and into which the compressed air from said reservoir passes for the purpose of extracting therefrom the heat due to combustion, said cylinders being provided with pistons and inlets, outlets, passages and valves by means of which the oil and air or other combustible, the air to be compressed and the compressed air are admitted into the two series of cylinders and the compressed air conducted from the compression cylinders into the reservoir and from the reservoir into the combustion cylinders, mixed with the products of combustion and passed into a pipe or trunk common to all the combustion cylinders, from which the mixture may be drawn off as required substantially as described herein.

2. An apparatus for generating a motive fluid to be used expansively in a separate motor or motors consisting of a series of combustion chambers and cylinders and compression cylinders arranged end to end and disposed in sets and tiers around a common crank shaft, ports and non-return valves for admitting air into said compression cylinders, a reservoir or receptacle common to all the compression cylinders adapted to receive the compressed air from the compression cylinders, non-return valves between the compression cylinders and said common reservoir or receptacle, ports communicating between said reservoir and the combustion cylinders, fuel or combustible and exhaust valves opening into the combustion chambers, a disk carried by said crank shaft and provided with two sets of cams or inclines, shafts corresponding in number to the combustion chambers and each provided at its inner end with a lever carrying a roller adapted to engage with one set of cams and provided at its outer end with a second lever connected to a link and lever adapted to open the exhaust valve, a sleeve surrounding each shaft and provided with a lever carrying roller, adapted to engage with the other set of cams and provided at its other end with a lever connected by means of a link to a bell-crank lever operating the fuel or combustible valve and bearings for supporting the sleeves and shafts, substantially as described.

In testimony whereof I have signed my name to this specification in the presence of two subscribing witnesses.

WILLIAM JOHN RENSHAW.

Witnesses:
THOMAS HENRY STEPHEN,
FREDERICK CHESTERTON.